United States Patent [19]

Sawamura

[11] Patent Number: 4,825,240
[45] Date of Patent: Apr. 25, 1989

[54] CAMERA

[75] Inventor: Masataka Sawamura, Hachioji, Japan

[73] Assignee: Konica Corporation, Tokyo, Japan

[21] Appl. No.: 113,545

[22] Filed: Oct. 26, 1987

[30] Foreign Application Priority Data

Oct. 29, 1987 [JP] Japan .................... 62-259228

[51] Int. Cl.⁴ ................................. G03B 7/26
[52] U.S. Cl. ................................. 354/484; 354/400; 354/439
[58] Field of Search ................ 354/400-408, 354/436, 437, 439, 451, 452, 468, 463, 484, 234.1, 173, 1, 173.11

[56] References Cited

U.S. PATENT DOCUMENTS

| 4,319,171 | 3/1982 | Motoori | 354/400 |
|---|---|---|---|
| 4,344,024 | 8/1982 | Cocron | 354/403 |
| 4,408,857 | 10/1983 | Frank | 354/234.1 |
| 4,496,229 | 1/1985 | Ogasawara | 354/400 |
| 4,589,753 | 5/1986 | Kawai | 354/400 |
| 4,634,221 | 1/1987 | Hopfner | 354/234.1 |
| 4,648,701 | 3/1987 | Ogihava et al. | 354/439 |
| 4,699,488 | 10/1987 | Suzuki et al. | 354/173.11 |
| 4,733,261 | 3/1988 | Gunshi et al. | 354/400 |

Primary Examiner—Russell E. Adams
Attorney, Agent, or Firm—Frishauf, Holtz, Goodman & Woodward

[57] ABSTRACT

In a camera including a driven member which is moved by a motor powered by a battery from a photographing position to an initial position through a gear train, and is stopped by mechanical damping, energization of the motor after a photographing operation is completed is controlled by pulse energization after the motor is started.

10 Claims, 3 Drawing Sheets

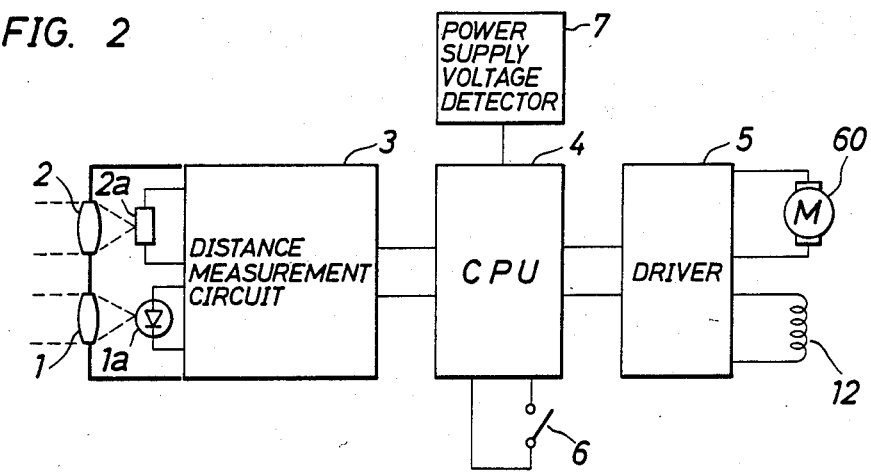

CAMERA

BACKGROUND OF THE INVENTION

1. Field of the Invention

The present invention relates to a camera having a member which is reciprocally moved to a photographing position each time a photographing operation is performed like a photographing lens in, e.g., an auto-focus camera.

2. Description of the Prior Art

An auto-focus camera comprises a cylindrical cam member having a plurality of continuous stepped teeth, i.e., a so-called lens positioning member, and an actuating member having grooved cams engaged with a photographing lens, i.e., a so-called a lens drive member as members for moving a photographing lens to an in-focus position, and regulating it at that position during exposure. In a positioning method of the auto-focus camera, a rotational position of the lens positioning member is first determined based on distance data from a distance measurement device. The lens drive member is then rotated to move the photographing lens along an optical axis by leads of the grooved cams, so that the photographing lens is caused to abut against a predetermined stepped tooth of the lens positioning member to be positioned at a photographing position.

The lens positioning and drive members must be operated over wider ranges as the camera has higher performance. Meanwhile, a high-speed focusing operation is required so as not to lose "shutter chance". Therefore, an elastic operation obtained by releasing a biased spring member in a conventional camera cannot provide constant drive power, and a capacity itself is also small. In recent cameras, in place of this conventional mechanism, the lens positioning and drive members are driven by utilizing high-speed, constant drive power of a motor incorporated in the camera.

As a result, even for a camera having a large aperture ratio and a relatively large focal length which requires high focusing precision and hence is considered to be difficult to have an automatic focusing function, a camera comprising an automatic focusing apparatus can be realized.

A photographing lens used in an auto-focus camera is linearly guided to move forward or backward along the optical axis such that a plurality of pins project from an outer periphery of a lens frame, and are engaged with straight grooves of a support member fixed to a lens barrel.

At the same time, the pins are also engaged with the grooved cams of the lens drive member. When the lens drive member is rotated in the circumferential direction, the pins are pushed by the corresponding inclined surfaces of the grooved cams so as to be moved along the optical axis and to abut against the stepped teeth. In this case, the photographing lens must be satisfactorily pressed by the predetermined stepped tooth to occupy an in-focus position. For this purpose, the lens drive member must be rotated to overcome the frictional resistance with the pins. Furthermore, the photographing lens must be held at the predetermined stepped tooth position until exposure is completed. Thus, the photographing lens must be biased in the rotational direction for a predetermined period of time to be satisfactorily fixed.

For this purpose, a strong motor capable of generating a large torque is used.

However, when the photographing operation is completed and the photographing lens is returned to an initial position, since the photographing lens is satisfactorily fixed to the predetermined stepped tooth by the frictional resistance between the pins of the photographing lens and the grooved cams in an initial process, a load is large, and the motor requires a large torque even when it is rotated in a reverse direction so as to start the lens drive member which is in a stop state. However, when the photographing lens begins to be disengaged from the stepped tooth after this process, the load of the lens drive member is immediately decreased.

As a result, the return speeds of the photographing lens, the lens drive member, and the lens positioning member following the lens drive member are increased. When the photographing lens reaches the initial position and the respective members are simultaneously stopped, a large shock is generated, and is applied to a power transmission system connected to the motor as well as to the respective members.

In general, a motor incorporated in a camera is placed at a position slightly separated from the photographing lens in terms of an installation space, and is coupled to the lens drive and positioning members through a plurality of reduction gear trains. The power transmission system includes many connecting portions, and shafts are easy to flex. In addition, since a gear of a small module is used and the number of teeth cannot be increased, the gears are not resistant to the above-mentioned shock. That is, the gears may be worn, damaged, or cause a so-called tooth lock state wherein the tooth tip of the drive gear abuts against that of the driven gear so as not to be rotated in neither forward nor reverse direction.

SUMMARY OF THE INVENTION

It is a first object of the present invention to provide a camera which can eliminate a shock when members driven by a motor are returned to their initial positions.

It is a second object of the present invention to provide a camera which can switch energization of a motor between continuous energization and pulse energization depending on a value of a battery voltage.

According to the present invention, members, which are returned to their initial positions after a photographing operation like a photographing lens in an auto-focus camera, can be returned and stopped without accompanying a shock by power from a motor whose rotational speed is reduced even in a state wherein a power supply voltage of a battery as a power source incorporated in a camera is sufficiently high. Thus, respective members including the photographing lens, and a power transmission system of the motor can be prevented from receiving shock. Therefore, a high-performance camera with high durability can be provided.

BRIEF DESCRIPTION OF THE DRAWINGS

FIG. 2 is a block diagram showing a control circuit for the camera according to the present invention;

FIGS. 3A and 3B are timing charts of signals during an automatic focusing operation of the camera according to the present invention, in which FIG. 3A represents a state before a photographing operation, and FIG. 3B represents a state after the photographing operation; and FIGS. 4A and 4B are diagrams for explaining the automatic focusing operation of the camera according to the present invention, in which FIG. 4A shows an initial position, and FIG. 4B shows an in-focus position.

DETAILED DESCRIPTION OF THE PREFERRED EMBODIMENTS

An embodiment of a camera in which the present invention is applied to an automatic focusing apparatus will be described with reference to FIGS. 1 to 4.

Figure 1:
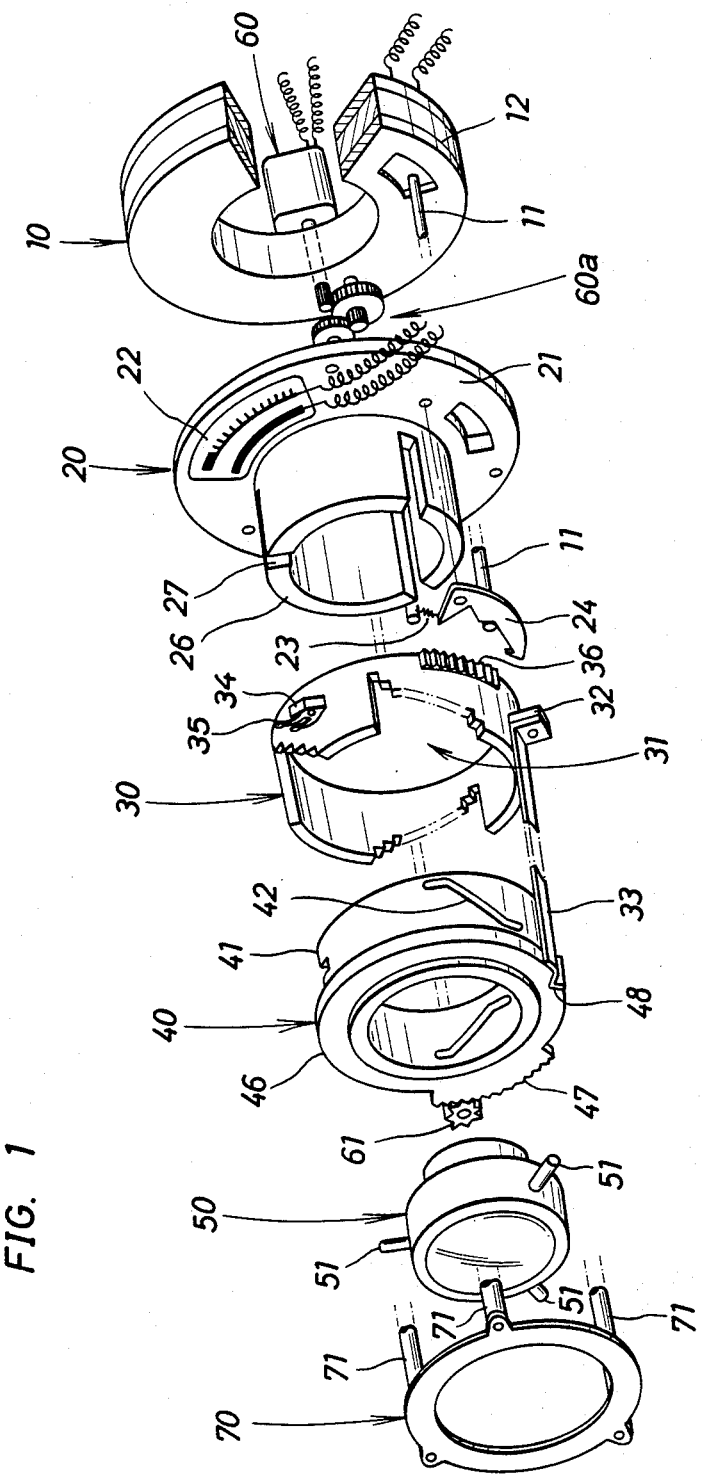
FIG. 1 is an exploded perspective view showing a principal part of an automatic focusing apparatus for a camera according to the present invention.

FIG. 1 is an exploded view of members constituting an apparatus of the present invention for a camera along an optical axis. These members are incorporated in a lens barrel portion of the camera as a unit, and are driven and controlled by a power supply and a controller arranged in a camera main body.

Reference numeral 10 denotes an electromagnetic unit fixed inside the lens barrel. The electromagnetic unit 10 houses a first movable coil member (not shown) for controlling an exposure amount of a photographing lens, and a second movable coil member 12 on which a regulating pin 11 for regulating a lock member (to be described later) projects to be pivotal about an optical axis.

Reference numeral 20 denotes a lens guide mounted on the front surface of the electromagnetic unit 10. The lens guide 20 comprises a flange portion 21 and a cylindrical portion 26. A printed circuit board 22 having a detection pattern for sending lens position data to the controller is provided on the flange portion 21. In addition, a stop pawl 24 which is biased clockwise by a tensile spring 23 is axially supported on the flange portion 21. Note that clockwise rotation of the stop pawl 24 is interfered with by the lock effect of the regulating pin 11 of the electromagnetic unit 10.

Three straight grooves 27 are formed in the peripheral surface of the cylindrical portion 26 at equal angular intervals to extend along the optical axis. The grooves 27 respectively receive guide pins 51 of a photographing lens 50 as a first driven member which is slidably engaged with the inner peripheral surface, so that the photographing lens 50 can reciprocate along the optical axis.

Reference numeral 40 denotes a lens drive member as a second driven member which is pivotally engaged with the outer periphery of the cylindrical member 26 of the lens guide 20. The lens drive member 40 has a cylindrical member 41. Three cam grooves 42 formed in the cylindrical portion 41 are respectively engaged with the guide pins 51 of the photographing lens 50 to define a state for regulating a straight moving position of the photographing lens 50 together with the straight grooves 27. The lens drive member 40 can be pivoted clockwise from an illustrated position in FIG. 1 by a pinion 61 of a gear train 60a connected to a DC motor 60 using a battery incorporated in the camera as a power supply, and can be pivoted counterclockwise to return to the illustrated position.

Reference numeral 30 denotes a lens positioning member as a third driven member fitted on the cylindrical portion 41 of the lens drive member 40. Three stepped cams 31 are formed on the end face of the lens positioning member 30 in correspondence with the guide pins 51. The stepped cams 31 are in contact with the guide pins 51 of the photographing lens 50, so as to set the photographing lens 50 at a predetermined focusing position. The lens positioning member 30 and the lens drive member 40 are integrated such that the distal end of a compression spring 33 mounted on a projection 32 of the lens positioning member 30 is engaged with a V-shaped notch 48 formed on the flange portion 46 of the lens drive member 40. The members 30 and 40 are simultaneously rotated by the motor 60.

In this state, the cam grooves 42 of the lens drive member 40 are arranged to be substantially parallel to the corresponding stepped cams 31 of the lens positioning member 30, and to be slightly separated therefrom so as not to cause the guide pins 51 of the photographing lens 50 regulated by the grooved cams 42 to be in contact with the corresponding stepped cams 31.

A contact 35 is mounted on another projection 34 of the lens positioning member 30, and is in sliding contact with an ON/OFF circuit pattern on the printed circuit board 22 of the lens guide 20 upon rotation of the lens drive member 40 so as to supply a pulse signal to the controller. A pawl gear 36 to be engaged with the stop pawl 24 actuated in response to a signal from the controller is also formed on the lens positioning member 30.

The lens drive member 40 and the lens positioning member 30 are pivotally clamped between the front surface of the flange portion 21 of the lens guide 20 and a back surface of a press plate 70 mounted on the flange portion 21 through three columns 71.

FIG. 2 is a block diagram of a controller for a camera according to the present invention. Reference numeral 1 denotes a projection lens for projecting infrared light emitted from an infrared light emitting diode 1a toward an object; 2, a light receiving lens for receiving the infrared light reflected by the object; 2a, a position detection element for converting the infrared light passing through the light receiving lens 2 and converting it into a current; 3, a distance measurement circuit for sending a light emission signal to the infrared light emitting diode 1a and amplifying a distance signal output from the position detection element 2a; 4, a CPU for calculating a distance to the object based on the distance signal, and supplying a drive signal to a driver 5 based on the calculation result; 6, a switch simply representing a pulse signal generation means constituted by the contact 35 provided to the lens positioning member 30 and the printed circuit board 22 provided to the lens guide 20; and 7, a power supply voltage detector for detecting that the power supply voltage of the camera is decreased below a predetermined value.

Note that reference numeral 12 denotes the second movable coil member of the electromagnetic unit 10; and 60, the lens drive motor, which have already been explained with reference to FIG. 1.

Lens drive control by the controller will be described with reference to the timing charts shown in FIGS. 3A and 3B. FIG. 3A shows a photographing lens drive mode before a photographing operation, and FIG. 3B shows a mode when the photographing lens is returned after the photographing operation is completed.

In synchronism with the shutter release operation of the camera, the distance measurement circuit 3 detects an object distance, and inputs distance data to the CPU 4. At the same time, as shown in FIG. 3A(a), the second movable coil member 12 is energized for the purpose of safety to apply a counterclockwise rotation torque to the regulating pin 11. When the stop pawl 24 is undesirably engaged with the pawl gear 36 of the lens positioning member 30, the coil member 12 serves to disengage them.

The motor 60 is started slightly after actuation of the regulating pin 11, as shown in FIG. 3A(b), so as to simultaneously rotate the lens drive member 40 and the lens positioning member 30 clockwise.

Upon this rotation, the photographing lens 50 is linearly moved backward, and sliding contact between the contact 35 and the printed circuit board 22 is started to supply a pulse signal (FIG. 3A(c)) corresponding to the position of the photographing lens 50 to the CPU 4. Then, the pulse signal is compared with a reference position of the photographing lens 50 which is set in advance in correspondence with the distance data from the distance measurement circuit 3. When a coincidence is established therebetween, rotation of the motor 60 is temporarily stopped, and the second movable coil member 12 is reversed to cause the regulating pin 11 to pivot counterclockwise. Therefore, the stop pawl 24 is engaged with the pawl gear 36 to forcibly stop the rotation of the lens positioning member 30.

After actuation of the second movable coil member 12, the motor 60 is restarted to further rotate the lens drive member 40 clockwise. Therefore, the compression spring 33 mounted on the lens positioning member 30 is disengaged from the notch 48, and the lens drive member 40 is solely rotated.

Upon rotation of the lens drive member 40, the guide pins 51 of the photographing lens 50 held at positions separated from the stepped cams 31 are brought into contact with predetermined steps of the corresponding stepped cams 31 to set the photographing lens 50 at a position along the optical axis corresponding to the distance data from the distance measurement circuit 3. After a predetermined period of time has passed, the motor 60 is stopped.

In this manner, the focusing operation of the photographing lens 50 with respect to an object is performed, and subsequently, exposure is performed upon actuation of the first movable coil member. After the photographing operation is completed, the second movable coil member 12 is again energized in response to a signal indicating the end of the photographing operation to pivot the regulating pin counterclockwise, thereby disengaging the stop pawl 24 from the pawl gear 36.

Then, the motor 60 is rotated in the reverse direction. Upon reverse rotation of the motor 60, the lens drive member 40 is rotated counterclockwise to linearly move the photographing lens 50 forward. Thereafter, when the notch 48 has reached a position at which it can be engaged with the compression spring 33 of the lens positioning member 30, the motor 60 further rotates the lens drive member 40 counterclockwise together with the lens positioning member 30 to be returned to an initial state. Thereafter, the motor 60 is stopped at a photographing position in an initial stop state for the motor. In this invention, after the initial stop state is shifted to a start state, energization for reversing the motor 60 is switched to predetermined pulse energization in accordance with a value of a power supply voltage to reduce the rotational speed of the motor 60.

More specifically, during an initial process of the motor return operation, the motor 60 is continuously energized for 50 msec regardless of the value of the power supply voltage indicating a degree of consumption of a battery incorporated in the camera to rise a start torque of the motor 60, thereby starting the lens drive member 40 against a frictional load between the grooved cams 42 and the guide pins 51.

When the motor 60 is started by the continuous energization and begins to accelerate, if it is detected in accordance with a signal from the power supply voltage detector 6 that a power supply voltage is higher than a rated voltage and may cause the motor 60 to rotate at high speed and to apply a strong shock, after 50-msec continuous energization, it is switched to pulse energization. With this control operation, the rotational speed of the motor 60 is reduced.

A pulse width P of the pulse energization is determined taking loads of the respective driven members or the level of a voltage to be defined, and must be selected and determined so as not to apply a large inertia to the photographing lens 50 and hence not to generate a large shock.

For example, 20 msec after a last pulse signal is detected upon reverse rotation of the lens positioning member 30, the photographing lens 50 is completely returned to its initial position, and pulse energization is performed for 180 msec until the photographing lens 50 stops completely, even taking bounce into account. Thus, the photographing lens is urged at a stop position to be completely returned to the initial position.

Note that when the power supply voltage detector 6 detects that the power supply voltage is lower than a rated voltage and determines that no strong shock is generated even if the motor 60 is rotated at high speed, continuous energization is performed in the same manner as in backward movement. In the above embodiment, energization times 50 msec, 20 msec, and 180 msec may be changed depending on mechanisms to be used.

In the above embodiment, the continuous energization time to the motor at the beginning of the return movement is preset to be 50 msec. However, this time may be determined based on the pulse signal. More specifically, when the number of pulse signals has reached a predetermined value, the continuous energization may be switched to pulse energization.

During reverse rotation of the motor 60, even if the lens positioning member 30 is driven by friction or the like before it is integrated with the member 40 upon engagement of the compression spring 33 and the notch 48, since its rotational angle is limited, the members 30 and 40 can be engaged with each other during return movement of the lens drive member 40 to establish the above-mentioned state, and thereafter are stopped.

The grooved cams 42 of the lens drive member 40 used in the focusing apparatus also have the following function.

Figure 4A:
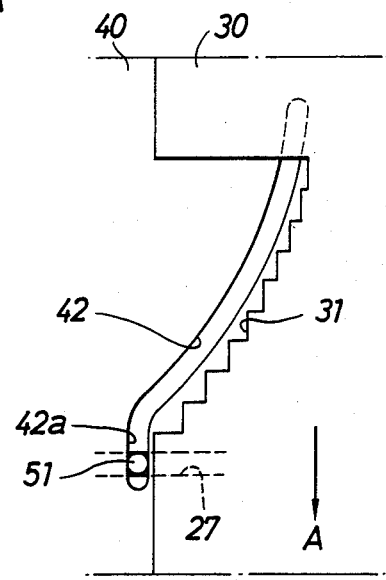

More specifically, as shown in FIG. 4A, in a state wherein the lens drive member 40 is at the initial position and is engaged integrally with the lens positioning member 30, each grooved cam 42 is substantially parallel to the corresponding stepped cam 31 and is slightly separated therefrom. In addition, a start portion 42a of each cam 42 is linearly bent along a rotational direction A of the lens drive member 40.

Therefore, when the motor 60 is started to rotate the lens drive member 40 and the lens positioning member 30 in the rotational direction A, it does not receive a load for moving the guide pins 51, i.e., the photographing lens 50 along the optical axis, and a short in torque upon rising of the motor 60 can be compensated. Since the start portion 42a is bent, it does not separate each guide pin 51 from the corresponding stepped cam 31 too much to minimize a moving range of the photographing lens 50. In this manner, a space inside the lens barrel can be saved.

Figure 4B:
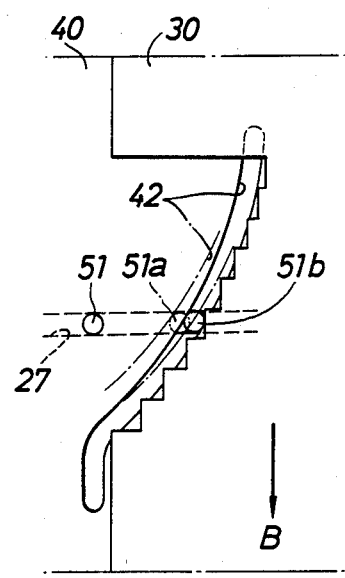

Note that in FIG. 4B, the position of each grooved cam 42 when the rotation of the lens positioning member 30 is stopped is indicated by alternate long and short dashed curves, and the position of the grooved cam 42 when the lens drive member 40 is slightly rotated in a rotational direction B from the above state is indicated by solid curves. Each guide pin 51 is sequentially moved from a position of a guide pin 51a to a position of a guide pin 51b, and is brought into contact with the predetermined stepped cam 31 to set the photographing lens 50 at an in-focus position.

In this embodiment, the present invention is applied to an automatic focusing apparatus of a camera. However, the present invention may also be applied to a mechanism which is reciprocated at high speed by a motor, like a shutter opening/closing apparatus of a camera.

What is claimed is:

1. A camera having a driven member vulnerable to be damaged by mechanical shock if the driven member travels at excessive speed and is then stopped at a desired position, comprising:
   a battery;
   a voltage sensor coupled to the battery;
   a DC motor;
   an electrically driven member coupled to the DC motor;
   driver means coupled the battery to the DC motor; and
   control means for setting the driver means to apply a first signal, comprising a DC signal, to the DC motor when said driven member is moved from a first position to a second position, and for applying a second signal to the DC motor different from the first signal as said driven member is moved from the second position toward said first position;
   said control means being coupled to the voltage sensor for setting the driver means to apply said second signal to the DC motor in response to an output of the voltage sensor to maintain motion of the driven member below said excessive speed.

2. A camera according to claim 1, wherein said driven member comprises a photographing lens.

3. A camera according to claim 1, wherein said driven member comprises a shutter opening/closing apparatus.

4. A camera according to claim 1, wherein said driver means applies the second signal to include at least a controllably intermittent signal if the battery voltage is above a threshold level.

5. A camera according to claim 4, wherein said control means sets the driver means to vary the intermittent signal in response to the battery voltage for maintaining motion of the driven member below said excessive speed.

6. A camera according to claim 5, wherein said control means sets the driver means to apply the second signal to include a DC signal for a predetermined interval to initiate motion of the driven member from said second position to the first position.

7. A camera according to claim 6, further comprising position sensing means for detecting the position of travel of the driven member between said first and second positions, said control means being coupled to said position sensing means, and said predetermined interval being a preselected distance, whereby said control means sets the driver means to apply the second signal to include a DC signal for said preselected distance, and then applies said intermittent signal when the driven member moves outside of said preselected distance from the second position.

8. A camera according to claim 4, wherein said control means sets the driver means to apply the second signal to include a DC signal for a predetermined interval to initiate motion of the driven member from said second position to the first position.

9. A camera according to claim 6, further comprising timing means for detecting the start of travel of the driven member between said first and second positions to begin a preselected time period, said control means being coupled to said timing means, and said predetermined interval being said preselected time period whereby said control means sets the driver means to apply the second signal to include a DC signal for said preselected time period, and then applies said intermittent signal when said preselected time period expires.

10. A camera having a driven member vulnerable to be damaged by mechanical shock if the driven member travels at excessive speed and is then stopped at a desired position, comprising:
   a battery;
   a DC motor;
   an electrically driven member coupled to the DC motor;
   driver means coupling the battery to the DC motor; and
   control means for setting the driver means to apply a first signal to the DC motor when said driven member is moved from a first position to a second position, and for applying a second signal to the DC motor different from the first signal as said driven member is moved from the second position toward said first position;
   wherein said control means sets the driver member to apply the second signal to consist of a DC signal if the battery voltage is below a threshold level; and
   wherein the first signal is a DC signal.

* * * * *